(12) United States Patent
Blotenberg

(10) Patent No.: US 6,269,299 B1
(45) Date of Patent: Jul. 31, 2001

(54) PROCESS FOR THE REMOTE-CONTROLLED START-UP OF MACHINERY, ESPECIALLY COMPRESSORS AND TURBINES

(75) Inventor: Wilfried Blotenberg, Dinslaken (DE)

(73) Assignee: GHH Borsig Turbomaschinen GmbH (DE)

( * ) Notice: Subject to any disclaimer, the term of this patent is extended or adjusted under 35 U.S.C. 154(b) by 0 days.

(21) Appl. No.: 08/901,045

(22) Filed: Jul. 28, 1997

(30) Foreign Application Priority Data

Aug. 21, 1996 (DE) .............................. 196 33 602

(51) Int. Cl.$^7$ .............................. G08B 5/22; G05B 23/00
(52) U.S. Cl. .............................. 701/100; 701/24; 701/48; 290/40 R; 700/159; 340/825.06; 340/825.08; 340/825.22; 340/825.29
(58) Field of Search .............................. 701/100, 48, 24; 364/131; 290/40 R; 700/159, 170, 174; 340/825.06, 825.08, 825.22, 825.23, 825.29

(56) References Cited

U.S. PATENT DOCUMENTS

| | | | | |
|---|---|---|---|---|
| 5,291,416 | * | 3/1994 | Hutchins .......................... | 364/474.16 |
| 5,444,861 | * | 8/1995 | Adamec et al. .................... | 395/700 |
| 5,650,940 | * | 7/1997 | Tonozuka et al. ............... | 364/514 C |
| 5,790,798 | * | 8/1998 | Beckett, II et al. ............ | 395/200.54 |
| 5,896,292 | * | 4/1999 | Hosaka et al. .................. | 364/468.15 |

* cited by examiner

Primary Examiner—William A. Cuchlinski, Jr.
Assistant Examiner—Tuan C To
(74) Attorney, Agent, or Firm—McGlew & Tuttle, PC.

(57) ABSTRACT

The present invention pertains to a method/process and system for parameterizing, structuring and programming control and regulating systems for pieces of machinery, especially turbines and compressors as well as drive units thereof, wherein these are connected to a control and regulating system via feedbacks and control lines. These control lines transmit measured values from the piece of machinery to the control and regulating system via measuring transducers. These control lines transmit adjustment commands from the control and regulating system to actuating drives of the piece of machinery. A first or local programming device is connected to the control and regulating system via a programming line. A monitor is provided for displaying the operating data and programs, as well as a keyboard for entering control commands and programming instructions are connected to the said first programming device. A second or remote programming device, located in a central control station or development laboratory and likewise equipped with a monitor and a keyboard, is connected to the first programming device via a long-distance data line. This long-distance data line may be a public telephone line, a wireless mobile telephone connection, a satellite connection, or a terrestrial radio connection.

19 Claims, 1 Drawing Sheet

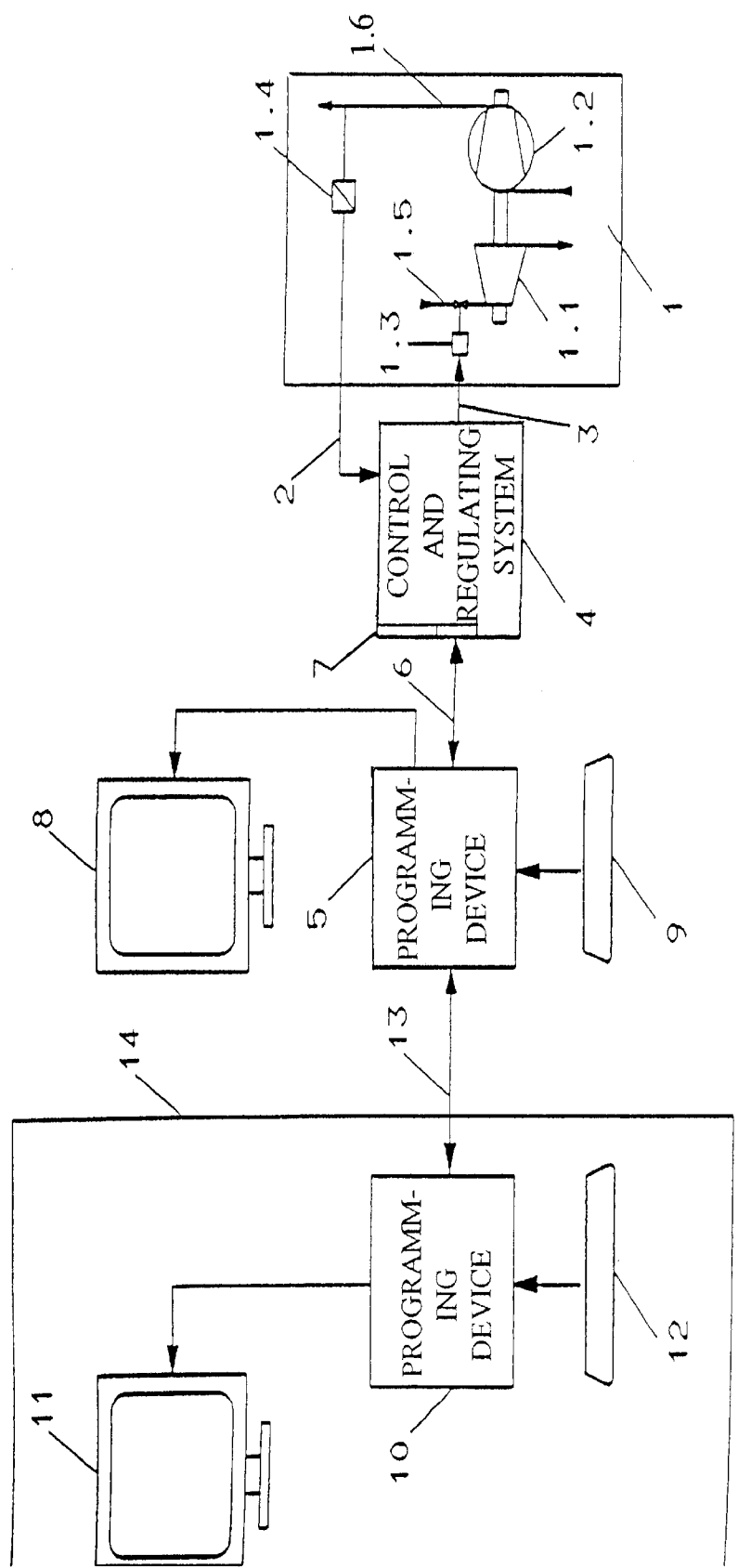

PROCESS FOR THE REMOTE-CONTROLLED START-UP OF MACHINERY, ESPECIALLY COMPRESSORS AND TURBINES

FIELD OF THE INVENTION

The present invention pertains to a method for the parameterization, structuring and programming of control and regulating systems as well as machine management systems for pieces of machinery, especially turbines and compressors, as well as drive units and accessories thereof

BACKGROUND OF THE INVENTION

Pieces of machinery, especially turbines and compressors as well as their drives, are increasingly equipped with complex digital controls and regulators.

Modern digital regulators and controls make it possible, on the one hand, to determine the specific load of the machine more accurately at the given operating point by the use of complex calculation methods and to load the machine components higher as a result, without reducing the service life of the entire piece of machinery. On the other hand, using complex control and regulation algorithms, an automatic protection of the piece of machinery can be achieved even against incidents which were uncontrollable before.

As the complexity of the regulation and control algorithms increases, the start-up of such pieces of machinery also requires a comprehensive knowledge of the system.

Compressors and turbines are used worldwide, frequently in very remote areas, e.g., in gas compressor stations along natural gas pipelines, on oil drilling platforms, but also in chemical or petrochemical plants.

To start up a compressor or turbine, it is necessary to optimize control parameters, and the piece of machinery is operated together with the upstream and downstream process. The control parameters are to be set at the time of this first operation of the complete unit such that the control circuits will respond to changes in the set point and the actual value as quickly as possible, but they nevertheless display a stable behavior in the entire working range. This optimization can be performed only at the site of installation during the operation of the entire unit.

Furthermore, limit values for hazardous states are to be determined and parameters are to be correspondingly adjusted within the regulation and control at the time of the first start-up or at the time of a start-up after shutdowns.

Modern machine monitoring systems make it possible to represent the current working point of the machine dynamically in a characteristic diagram. Such characteristic diagrams may represent, e.g., the difference in enthalpy as a function of the volume flow, but also the efficiency or the power generated or consumed as a function of the flow. The dynamic display of the current working point in the characteristic diagram enables the operating personnel to evaluate the operating performance as well as the operating reserves available. Other representations provide information on, e.g., soiling conditions, etc.

The characteristic diagrams of the machines are usually calculated theoretically and are programmed in the machine-monitoring unit before the piece of machinery is shipped. However, the characteristic diagram measured after the completion of the piece of machinery may deviate from the theoretically calculated one because of manufacturing tolerances.

The characteristic diagram is therefore usually measured during the start-up and is compared with the calculated characteristic diagram. In the case of deviations, the parameters are to be changed in the program of the machine-monitoring unit such that the characteristic diagram represented will correspond to the measured characteristic diagram.

The characteristic diagram of the piece of machinery may change after a relatively long operating time either due to changes within the plant, e.g., due to changes in the pipeline routing, but also due to wear or contamination of the piece of machinery. Adjustment of the characteristic diagrams being stored or of the calculation algorithms is necessary in these cases to determine the characteristic diagrams or their parameters from time to time.

Modern digital controllers and controls make it possible to change over algorithms and control sequences by making changes in the software, without any changes being necessary in the hardware. It is thus possible to regularly update regulation and control algorithms to the latest technical development at low cost.

All the above-mentioned changes make it necessary for experts to be present on the site, who can analyze the measured data and can determine from them the values to which the parameters are to be set or how the algorithms are to be changed and how the corresponding changes are to be made in the program.

The sending of experts to the remote operating sites is often associated with high costs. In the case of sudden breakdowns, a software expert has to travel to the plant to analyze the operating parameters measured and recorded on the site and to infer the cause of the disturbance from them. To avoid further incidents, it is often necessary to make changes in the software. These changes are to be made and tested by the expert on the site.

Hours or even days frequently pass before an expert arrives at the plant. The plant is not ready to operate during this time. The cost due to the loss of production is often considerable.

Transmission processes which make possible the transmission of measured values from any site to another site via long-distance data line have been known for a long time. These make it possible for an expert to obtain information on the operating state of a machine or plant from another site and to analyze that information at his usual place of work. He can then give recommendations to another expert present at the site to change parameters or program structures, which the expert present at the plant can implement. The need for an expert to be present at the site cannot be eliminated in this process.

Transmission processes have also been known, which make possible the transmission of computer programs from any site to another site via long-distance data line. However, these processes do not accomplish the object according to the present invention, because the program transmitted via the long-distance data line must be loaded into the regulation and control system on the site via a programming device and it must be started. These activities also make necessary the presence of a systems specialist at the site.

A programming device is usually connected locally to the control and regulating system to start up a piece of machinery. The programming devices are permanently installed in some controls and regulations, e.g., in a system according to EP 0 378 713. A change that needs to be performed in the program for the control and regulating system is performed such that the complete program is loaded into the programming device, and the change is performed in the programming device. The changed program is then loaded in full length into the memory of the control and regulating system. The entire program, which is frequently rather comprehensive, must be reloaded even if only one line of the program is changed. This requires high-speed data transmission, which is possible with broad-band data lines only. The programming device must therefore be located in the vicinity of the control and regulating system at the time of the start-up. Remote programming is not worthwhile because of the high cost of transmission with broad-band data lines, and frequently it is also technically unfeasible.

Immediate feedback of the effect of a change in parameters, structures or program on the process is frequently indispensable at the time of start-up. The expert must have a possibility of immediately intervening with the control and regulating system, and he also must be able to perform control commands, should the change made in the parameters, structures or programs lead to an unacceptable or even hazardous mode of operation of the machine or plant. This also requires broad-band data lines from the piece of machinery to the programmer.

SUMMARY AND OBJECTS OF THE INVENTION

The object of the present invention is to provide a method/process for starting up pieces of machinery installed at remote locations, which makes it possible to make changes in programs, structures and parameters in control and regulating systems as well as machine-monitoring systems from a central control station or a development laboratory, and also to reduce the duration of shutdowns of process plants after breakdowns of the plant, without an expert being present at the site of installation of the pieces of machinery.

According to the invention, a method for the parameterization, structuring and programming of control and regulating systems as well as of machine management systems for pieces of machinery, especially turbines and compressors as well as drive units and accessories thereof is provided. The method includes connecting a control and regulating system or a machine management system of the piece of machinery, which control or regulating system or machine management system is connected to a said first programming device, by means of a said long-distance data line, to a second programming device. The second programming device contains all the functions that are also offered by a first programming device connected to the control and regulating system or to the said machine management system. All operating data of the piece of machinery are polled by the second programming device and all parameters and program structures can be changed.

The present invention describes a method/process that makes it possible to parameterize or program even pieces of machinery with complex control and regulating systems from any desired site by means of a usual data line, a telephone line, without an expert being present at the site of the piece of machinery.

A first programming device, which is connected to the control and regulating system or the machine-monitoring system of the piece of machinery, is located according to the present invention at the site of the external plant. Both parameters and program structures or entire programs can be changed, copied or reinstalled by this first programming device. A second programming device is located at another location, e.g., in a central control station or in a development laboratory. The two devices are connected via a long-distance data line and modems or the like. If the first programming device of the piece of machinery permits the current operating parameters to be polled and be displayed on the display screen connected to it, the second programming device in the central control station also displays the same parameters. If the display of certain operating data or of a group of operating data is selected in the second programming device, the first programming device polls these values from the control and regulating system and displays them on the display screen. The same operating data are also displayed on the display screen of the second programming device.

With such a process, an expert present at the site of the second programming device has full access to the first programming device and consequently also to the entire control and regulating system, in exactly the same manner as if he were sitting in front of the first programming device in the plant. He can change any parameters or program structures, he can observe the effects directly and immediately, and he can immediately perform control interventions in the case of hazard.

The amount of data to be transmitted decreases considerably due to the use according to the present invention of two programming devices, one at the location of the piece of machinery and a second in the remote control station or development laboratory. A few control commands can trigger large amounts of actions at the respective other programming device, since the same programming software is loaded into both programming devices.

In another embodiment of the present invention, the mass storage units of the first programming device (hard disk, magnetic tape, floppy disk) at the external piece of machinery receive a different drive designation than the mass storage units of the second programming device in the central control station. This makes it possible to access the mass storage units of the other programming device from each programming device. As a result, a program that has been changed with the first programming device in the vicinity of the machine and is stored only on the mass storage unit of the first programming device or only in the memory of the control and regulating system can be read and edited by the second programming device. In addition, it is also possible to access stored operating data records from past operating periods from the second programming device, and to analyze and evaluate them. Complete programs may be transmitted in the same manner.

The use of the process according to the present invention is especially advantageous in the case of the use of mobile telephones. Connection to the public telephone network is often impossible, because there are no telephone connection lines in the vicinity of the external piece of machinery. If a mobile telephone with modem connection is used, it is possible to do without a local terrestrial telephone connection. The second programming device may also be connected via a mobile telephone to a portable programming device, e.g., a battery-operated, portable computer. It is thus possible for an expert, who may be at any location, even in an area far from the nearest telephone line, to start up a control and regulating system located at any location or to troubleshoot it.

The advantages of this process are apparent. The expensive travel of highly qualified experts with long travel and waiting times is avoided. The best available expert, wherever he may be located, can be informed over the telephone or radio in the case of a disturbance. Using a programming device that is available, he can get in touch with the control and regulating system at the plant, poll the current operating data and, if necessary, even historical operating data, and he can immediately begin the incident analysis, the elimination of the causes and the restart.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a schematic diagram of the programming device according to the present invention.

DESCRIPTION OF THE PREFERRED EMBODIMENT

Referring to the drawings in particular, the only FIGURE schematically shows a piece of machinery 1 which is connected to a control and regulating system 4 via feedback lines 2 and a control line 3. The feedback lines 2 transmit measured values from the piece of machinery 1 to the control and regulating system 4 via a measuring transducer 1.4. The control lines 3 transmit adjustment commands from the control and regulating system 4 to the actuator 1.3 of the piece of machinery 1, which comprises, e.g., an expansion turbine 1.1 for driving a compressor 1.2, the corresponding pipelines 1.5 and 1.6, as well as actuators 1.3 and measuring transducers 1.4. Other types of machines are conceivable as well for use with the process/method of the invention.

A first programming device 5 is connected to the control and regulating system 4 via a programming line 6. The programming line 6 is usually a multiwire special line of a length of a few m. If a program needs to be changed, the program for the control and regulating system 4, which is being stored in the program memory of the programming device 5, is changed in the first programming device 5 and is subsequently transmitted into the main memory 7 of the control and regulating system 4 via the programming line 6. Current operating data of the piece of machinery 1 are also transmitted via the programming line 6 to the first programming device 5. A monitor (display screen) 8 for displaying the operating data and programs, as well as a keyboard 9 for entering control commands and programming instructions, are connected to the first programming device 5.

A second programming device 10 in a central control station or a development laboratory 14 is also equipped with a monitor 11 and keyboard 12 and is connected to the first programming device 5 via a long-distance data line 13. This long-distance data line 13 may be a public telephone line, but also a wireless connection in the form of a mobile telephone connection, a satellite connection, or a terrestrial radio connection. All control commands and all displays on the monitors are coordinated between the two programming units 5 and 10 via the long-distance data line 13. Each programming command at the second programming device 10 is converted into control commands that can be transmitted via the long-distance data line 13 and is received by the first programming device 5. This will then process the command as if it had been entered directly at the site via the keyboard 9 of the first programming device 5. Operating data or information that are displayed on the monitor 8 of the first programming device 5 are converted into control commands that can be transmitted via the long-distance data line 13, and these control commands will bring about the display on the monitor 11 of the second programming device 10.

Since the same software is installed in each of the two programming devices 5 and 10, a few control commands are sufficient to trigger even complex control actions from a programming device 5, 10 in the respective other programming device 10, 5.

The amount of devices necessary for the first programming device 5 with monitor 8 and keyboard 9 can also be reduced. If no programmer is present in the vicinity of the first programming device 5, it is also unnecessary to install a monitor 8. The local keyboard 9 may be omitted as well. Furthermore, the amount of functions of the first programming device 5 may be reduced to such an extent that this device is only able to receive the control commands from the second programming device 10 in the central control station 14 and to implement them such that the necessary actions will be performed.

Data request commands of the second programming device 10 must be recognized, and the data and information requested must be transmitted via the long-distance data line.

A similar reduction in the amount of functions can also be performed for the second programming device 10 with the display screen 11 and the keyboard 12. Functions that are not necessary at this operating site, e.g., the writing in an EEPROM, may be eliminated from this programming device. Similar function reductions may be performed for unneeded software functions.

While a specific embodiment of the invention has been shown and described in detail to illustrate the application of the principles of the invention, it will be understood that the invention may be embodied otherwise without departing from such principles.

APPENDIX

List of Reference Numbers

1. Piece of machinery
1.1 Drive unit/expansion turbine
1.2 Compressor/turbocompressor
1.3 Actuating drives
1.4 Measuring transducer
1.5 Inlet line
1.6 Pipeline for medium
2 Feedback line
3 Control line
4 Control and regulating system, machine management system
5 Programming device at the site of the piece of machinery (first programming device)
6 Programming line
7 Program memory
8 Display screen/monitor
9 Entry keyboard
10 Programming device in the central control station or development laboratory (second programming device)
11 Display screen/monitor
12 Entry keyboard
13 Long-distance data line
14 Central control station/remote monitoring center/development laboratory

What is claimed is:

1. A method for the parameterization, structuring and programming of control and regulating systems as well as of machine management systems for machinery and drive units and accessories thereof, comprising:

providing one of a control and regulating system or a machine management system connected to the machinery, the one of a control and regulating system and a machine management system receiving operating data from the machinery and having parameters and program structures for the machinery;

providing a first programming device for programming the one of a control and regulating system or a machine management system for changing the program structures, the one of a control and regulating system or machine management system being connected to the first programming device;

providing a second programming device at a location remote from the machinery;

connecting the one of a control and regulating system or a machine management system by means of a long-distance data line to the second programming device;

providing the second programming device with all the functions that are also offered by the first programming device;

polling operating data of the piece of machinery by the second programming device; and changing one or more of parameters and program structures of the control and regulating system or machine management system with the first programming device by operating the first programming device by issuing programing commands from the second programming device to the first programming device.

2. The method in accordance with claim 1, wherein each programming device includes a data mass storage unit and each programming device can access the data mass storage units of the respective other programming device, and each programming device can write from and read to each mass storage unit.

3. The method in accordance with claim 1 wherein direct access is possible from the second programming device to the one of a control and regulating system or machine management system without a local programming device being present, and a public or private telephone line is used as the long-distance data line.

4. The method in accordance with claim 1, wherein a mobile radio telephone connection is used as the long-distance data line.

5. The method in accordance with claim 1, wherein a satellite connection is used as the said long-distance data line.

6. The method in accordance with claim 1, wherein that a terrestrial radio connection is used as the long-distance data line.

7. The method in accordance with claim 1, wherein the scope of the functions and performances of each of the two programming devices is reduced such that only the absolutely necessary functions are available.

8. The method in accordance with claim 1, further comprising providing a teletransmission center including said second programming device, wherein the long-distance data line and the programming devices are used after the machinery has been put into full industrial operation.

9. The method in accordance with claim 1, wherein the said long-distance data line and the programming devices are used for the remote control of the machinery.

10. A method for operating machinery including one or more turbines and compressors as well as drive units and accessories thereof, the method comprising the steps of:

providing one of a control and regulating system or a machine management system connected to the machinery, the one of a control and regulating system or a machine management system receiving operating data from the machinery and having parameters and program structures for the piece of machinery;

providing a local programming device adjacent to the location of the one of a control and regulating system or a machine management system for changing the program structures of the one of a control and regulating system or a machine management system, the one of a control and regulating system or machine management system being connected to the local programming device;

providing a remote programming device at a location remote from the machinery, the remote programming device for issuing programming commands to the local programming device;

connecting the remote programming device to the local programming device via a long distance data line established between the local programming device and the remote programming device;

polling operating data of machinery by the remote programming device via the local programming device and the long distance data line; and changing one or more of parameters and program structures of the control and regulating system or machine management system by loading one or more of the program structures in the local programming device, using the local programming unit based on programming commands issued by said remote programming unit to said local programming unit via the long distance data lines to modify the loaded program structures and loading the modified program structure in the one of a control and regulating system or a machine management system.

11. The method in accordance with claim 10, wherein each programming device includes a data mass storage unit and each programming device can access the data mass storage units of the respective other programming device, and each programming device can write from and read to each mass storage unit.

12. The method in accordance with claim 10, further comprising the step of:

using a public or private wide area network as the long-distance data line.

13. The method in accordance with claim 10, wherein a mobile radio telephone connection is used as the long-distance data line.

14. The method in accordance with claim 10, wherein a satellite connection is used as the said long-distance data line.

15. The method in accordance with claim 10, wherein that a terrestrial radio connection is used as the long-distance data line.

16. The method in accordance with claim 10, wherein the scope of the functions and performances of each of the two programming devices is reduced such that only the absolutely necessary functions are available.

17. The method in accordance with claim 10, further comprising providing a teletransmission center including said second programming device, wherein the long-distance data line and the programming devices are used after the machinery has been put into full industrial operation.

18. The method in accordance with claim 10, wherein the long-distance data line and the programming devices are used for the remote control of the piece of machinery.

19. A system for operating machinery including one or more turbines and compressors as well as drive units and accessories thereof, comprising:

one of a control and regulating system or a machine management system connected to the machinery, the one of a control and regulating system or a machine management system receiving operating data from the machinery and having parameters and program structures for the machinery and including feedback lines and control lines, said feedback lines transmitting measured values from the machinery to the control and regulating system via measuring transducers, and the control lines transmitting adjustment commands from the control and regulating system to actuating drives of the machinery based on the program structures;

a remote programming device at a location remote from the machinery, the remote programming device for issuing programming commands, the remote programming device including a data mass storage unit;

a local programming device, the one of a control and regulating system or machine management system being connected to the local programming device, the local programming device being disposed in the vicinity of the piece of machinery; and a long-distance data line connecting the local programming device to the remote programming device, the remote programming device polling operating data of the piece of machinery via the long-distance data line and changing one or more of parameters and program structures of the control and regulating system or machine management system with the second programming device, the long-distance data line being one of a wide area network, public telephone lines, public telephone lines, a mobile radio telephone connection, a satellite connection and a terrestrial radio connection, the remote programming device being provided with all the functions that are also offered by the local programming device, said local programming device including a data mass storage unit and said remote programming device selectively accessing the data mass storage unit of the local programming device, and the remote programming device selectively writing from and reading to the mass storage unit of said local programming device and the remote programming device issuing programming commands from the remote programming device to the local programming device and the local programming device changing one or more of parameters and the program structures of the of the at least one of a control and regulating system or a machine management system based on the selectively writing from and reading to the mass storage unit of said local programming device.

\* \* \* \* \*